(12) United States Patent
Crombe et al.

(10) Patent No.: US 9,366,196 B2
(45) Date of Patent: Jun. 14, 2016

(54) SYSTEM AND METHOD FOR LIMITING THROTTLE OPENING AREA BASED ON CAM PHASER POSITION TO MINIMIZE NOISE DURING ACCELERATION

(75) Inventors: Jonathan N. Crombe, Troy, MI (US); Andrew W. Baur, Whitmore Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1039 days.

(21) Appl. No.: 13/469,272

(22) Filed: May 11, 2012

(65) Prior Publication Data
US 2013/0104843 A1 May 2, 2013

Related U.S. Application Data

(60) Provisional application No. 61/553,333, filed on Oct. 31, 2011.

(51) Int. Cl.
| | |
|---|---|
| *F02D 11/10* | (2006.01) |
| *F02D 41/00* | (2006.01) |
| *F02D 13/02* | (2006.01) |
| *F02D 9/02* | (2006.01) |

(52) U.S. Cl.
CPC .......... *F02D 41/0002* (2013.01); *F02D 11/105* (2013.01); *F02D 13/0234* (2013.01); *F02D 13/0261* (2013.01); *F02D 2009/0228* (2013.01); *F02D 2009/0233* (2013.01); *F02D 2009/0296* (2013.01); *F02D 2041/001* (2013.01); *F02D 2041/002* (2013.01); *F02D 2200/0406* (2013.01); *F02D 2200/703* (2013.01); *Y02T 10/18* (2013.01); *Y02T 10/42* (2013.01)

(58) Field of Classification Search
CPC .................. F02D 2009/0235; F02D 2009/022; F02D 11/105; F02D 13/0234; F02D 13/0238; F02D 13/0261; F02D 13/0265; F02D 2041/001; F01L 1/34–1/348
USPC ................. 123/395, 396, 399, 681, 682, 687, 123/90.15–90.18
See application file for complete search history.

(56) References Cited

U.S. PATENT DOCUMENTS

| | | | | |
|---|---|---|---|---|
| 6,397,814 | B1* | 6/2002 | Nagaishi et al. | 123/348 |
| 6,626,144 | B1* | 9/2003 | Kanamaru | 123/399 |
| 8,234,049 | B2 | 7/2012 | Stempnik et al. | |
| 8,768,601 | B2 | 7/2014 | Yoshino et al. | |
| 2003/0066512 | A1* | 4/2003 | Russell et al. | 123/348 |
| 2006/0102144 | A1* | 5/2006 | Muto et al. | 123/399 |
| 2009/0234545 | A1 | 9/2009 | Stempnik et al. | |

(Continued)

FOREIGN PATENT DOCUMENTS

| | | |
|---|---|---|
| CN | 101531192 A | 9/2009 |
| CN | 102076942 A | 5/2011 |

(Continued)

*Primary Examiner* — Erick Solis

(57) ABSTRACT

A system according to the principles of the present disclosure includes a throttle limit determination module, a throttle area adjustment module, and a throttle control module. The throttle limit determination module determines a throttle limit based on an intake cam phaser position. The throttle area adjustment module adjusts a desired throttle area based on the throttle limit when the desired throttle area is greater than the throttle limit. The throttle control module controls a throttle opening area of a throttle valve based on the desired throttle area.

20 Claims, 4 Drawing Sheets

(56) References Cited

U.S. PATENT DOCUMENTS

2009/0319137 A1\* 12/2009 Miyanoo .................... 701/54
2011/0106410 A1   5/2011 Yoshino et al.
2012/0209493 A1\* 8/2012 Miyata et al. ................ 701/99

FOREIGN PATENT DOCUMENTS

| DE | 102004031226 A1 | 2/2006 |
| DE | 102008054514 A1 | 6/2010 |
| DE | 102009020650 A1 | 11/2010 |

\* cited by examiner

SYSTEM AND METHOD FOR LIMITING THROTTLE OPENING AREA BASED ON CAM PHASER POSITION TO MINIMIZE NOISE DURING ACCELERATION

CROSS-REFERENCE TO RELATED APPLICATIONS

This application claims the benefit of U.S. Provisional Application No. 61/553,333, filed on Oct. 31, 2011. The disclosure of the above application is incorporated herein by reference in its entirety.

FIELD

The present disclosure relates to engine control systems and methods, and more particularly to systems and methods for limiting a throttle opening area based on cam phaser position to minimize noise during acceleration.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts the throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

SUMMARY

A system according to the principles of the present disclosure includes a throttle limit determination module, a throttle area adjustment module, and a throttle control module. The throttle limit determination module determines a throttle limit based on an intake cam phaser position. The throttle area adjustment module adjusts a desired throttle area based on the throttle limit when the desired throttle area is greater than the throttle limit. The throttle control module controls a throttle opening area of a throttle valve based on the desired throttle area.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

An intake valve and an exhaust valve may open and close based on rotation of a camshaft. Cam phasers may regulate valve timing by rotating the camshaft relative to a crankshaft. When a vehicle accelerates, the cam phasers may be adjusted to a first position that corresponds to a peak volumetric efficiency of a cylinder. When the vehicle is at a steady speed, the cam phasers may be adjusted to a second position that is different than the first position to reduce the amount of torque produced by an engine.

Intake valve timing may be delayed when an intake cam phaser is in the second position relative to when the intake cam phaser is in the first position. Thus, the intake valve may close at a later time relative to when the intake cam phaser is in the first position. In turn, the intake valve may be open when a piston is returning to its topmost position, forcing air out of the cylinder and thereby causing a pressure wave. The pressure wave may travel through an intake system and cause induction noise.

In addition, a valve overlap period may be greater when the cam phasers are in the second position than when the cam phasers are in the first position. During the valve overlap period, both the intake valve and the exhaust valve are open. When the intake valve and the exhaust valve are open, exhaust gas may travel through the intake system, causing a pressure wave that leads to induction noise. The induction noise caused by late intake valve closing and the valve overlap period may be amplified when the throttle valve is opened to increase engine speed.

When torque is requested, the cam phasers may be adjusted from the second position to the first position to satisfy the torque request. As the cam phasers are adjusted, a throttle valve may be opened to compensate for the cam phaser positions. This may amplify the induction noise caused by late intake valve closing and valve overlap. For example, when an acceleration pedal is 30 percent depressed, the throttle valve may be 15 percent open and the intake cam phaser position may be 25 degrees retarded relative to the first position. When the acceleration pedal is depressed by an additional 5 percent, the throttle valve may be adjusted to 35 percent open as the intake cam phaser position is advanced, causing a 15 decibel (dB) increase in induction noise.

A system and method according to the principles of the present disclosure limits a throttle opening area based on cam phaser position to reduce induction noise. A desired throttle area may be determined based on driver input. A throttle limit may be determined based on engine speed, a valve overlap period, and/or an amount that intake valve timing is retarded relative to a timing that yields peak volumetric efficiency. The desired throttle area may be adjusted to the throttle limit when the desired throttle area is greater than the throttle limit.

Figure 1:
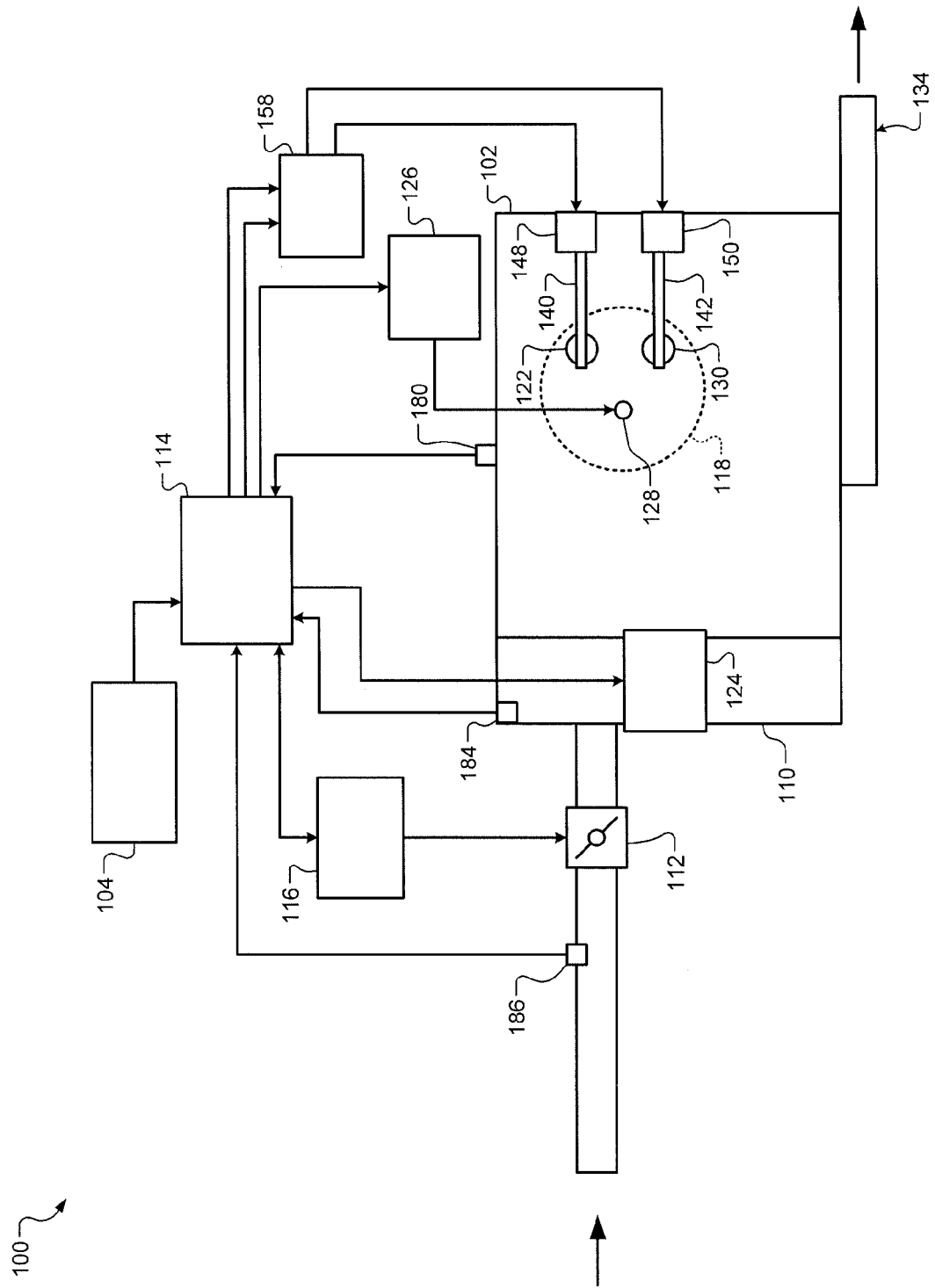
FIG. 1 is a functional block diagram of an example engine system according to the principles of the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into the engine 102 through an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may selectively deactivate some of the cylinders to improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC). During the exhaust stroke, the piston begins moving up from BDC and expels the byproducts of combustion through an exhaust valve 130. The byproducts of combustion are exhausted from the vehicle via an exhaust manifold 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The ECM 114 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may measure the speed of the crankshaft in revolutions per minute (RPM) using an RPM sensor 180. The pressure within the intake manifold 110 may be measured using a manifold absolute pressure (MAP) sensor 184. In various implementations, engine vacuum, which is the difference between the ambient air pressure and the pressure within the intake manifold 110, may be measured. Ambient pressure may be measured using an ambient atmospheric pressure (AAP) sensor 186. In various implementations, the ambient pressure may be estimated based on the pressure within the intake manifold 110. The ECM 114 may use signals from the sensors to make control decisions for the engine system 100. The ECM 114 may limit the opening of the throttle valve 112 based on engine speed and/or the positions of the intake cam phaser 148 and the exhaust cam phaser 150.

Figure 2:
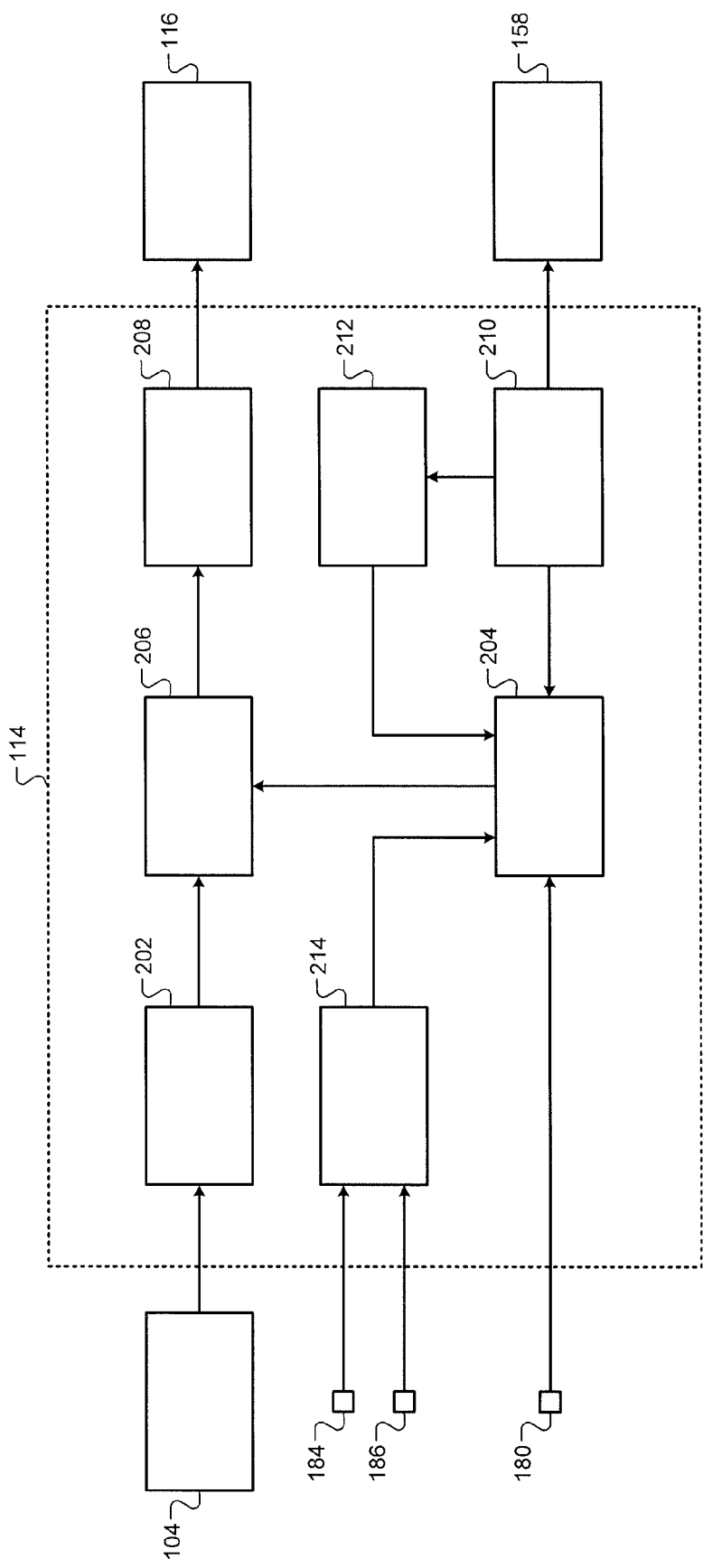
FIG. 2 is a functional block diagram of an example engine control system according to the principles of the present disclosure.

Referring now to FIG. 2, an example implementation of the ECM 114 includes a throttle area determination module 202, a throttle limit determination module 204, a throttle area adjustment module 206, and a throttle control module 208. The throttle area determination module 202 determines a desired throttle area based on driver input from the driver input module 104. The driver input may be based on a position of an accelerator pedal. The driver input may also be based on cruise control, which may be an adaptive cruise control system that varies vehicle speed to maintain a predetermined following distance. The throttle area determination module 202 may store one or more mappings of accelerator pedal position to desired throttle area, and may determine the desired throttle area based on a selected one of the mappings.

The throttle limit determination module 204 determines a throttle limit based on engine speed, an intake cam phaser position, and/or an exhaust cam phaser position. The throttle limit determination module 204 may receive the engine speed from the RPM sensor 180. The throttle limit determination module 204 may receive the intake cam phaser position and the exhaust cam phaser position from a phaser control module 210. The phaser control module 210 sends a signal to the phaser actuator module 158 to control the intake cam phaser 148 and the exhaust cam phaser 150. In addition, the throttle limit determination module 204 may receive the intake and exhaust cam phaser positions from sensors (not shown) that measure the cam phaser positions.

The throttle limit determination module 204 may decrease the throttle limit as engine speed decreases. The throttle limit determination module 204 may decrease the throttle limit as intake valve timing is retarded relative to a timing that yields peak volumetric efficiency. The throttle limit determination module 204 may determine the intake valve timing based on the intake cam phaser position. The throttle limit determination module 204 may decrease the throttle limit as a valve overlap period increases. During the valve overlap period, both the intake valve 122 and the exhaust valve 130 are open. The throttle limit determination module 204 may receive the valve overlap period from a valve overlap determination module 212.

The valve overlap determination module 212 determines the valve overlap period based on the intake cam phaser position and the exhaust cam phaser position. The valve overlap determination module 212 may receive the intake cam phaser position and the exhaust cam phaser position from the phaser control module 210 and/or from sensors (not shown) that measure the cam phaser positions. The valve overlap determination module 212 may determine the valve timing based on the cam phaser positions and determine the valve overlap period based on the valve timing.

The throttle limit determination module 204 may determine the throttle limit based on a ratio of the pressure within the intake manifold 110 to the ambient pressure. This ratio may be limited in the same manner that the throttle area opening is limited. The throttle limit determination module 204 may receive the pressure ratio from a pressure ratio determination module 214. The pressure ratio determination module 214 may determine the pressure ratio based on signals received from the MAP sensor 184 and the AAP sensor 186.

The throttle area adjustment module 206 determines whether the desired throttle area is greater than the throttle limit and adjusts the desired throttle area to the throttle limit when the desired throttle area is greater than the throttle limit. In this regard, the throttle limit may be an upper limit that is applied to the desired throttle area.

The throttle control module 208 sends a signal to the throttle actuator module 116 to control the throttle valve 112. The throttle control module 208 controls the throttle valve 112 to achieve the desired throttle area. The throttle control module 208 receives the desired throttle limit from the throttle area adjustment module 206.

Figure 3:
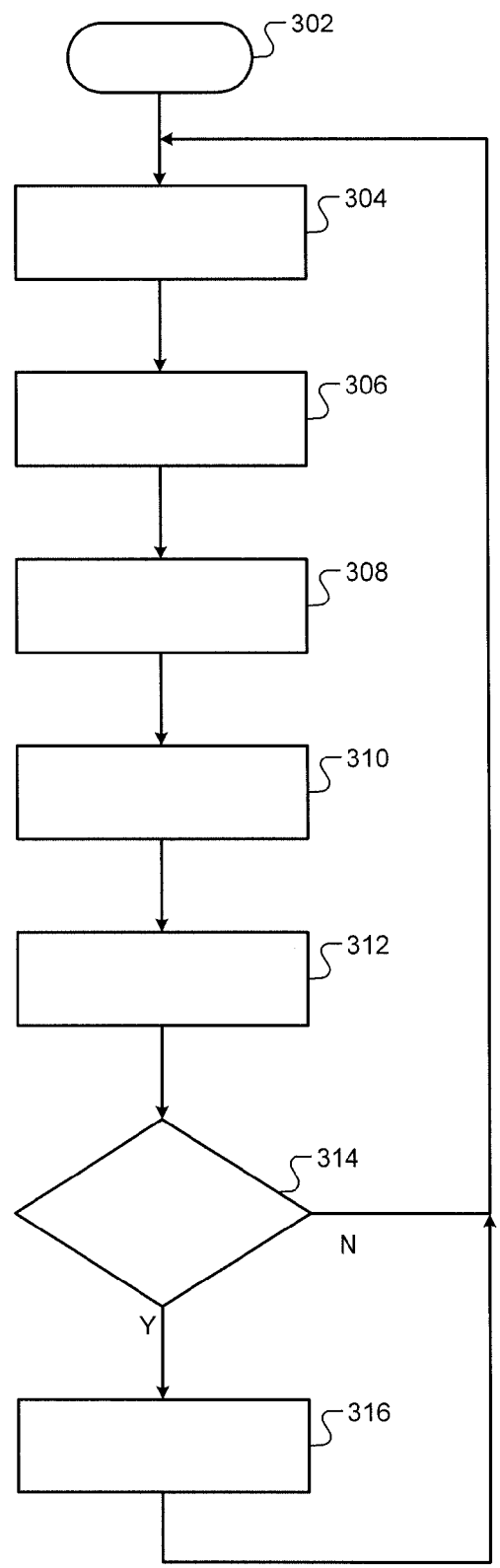
FIG. 3 is a flowchart illustrating an example engine control method according to the principles of the present disclosure.

Referring now to FIG. 3, a method for limiting a throttle opening area based on a cam phaser position to minimize noise during accelerations begins at 302. At 304, the method determines a desired throttle area. The method may determine the desired throttle area based on driver input. The driver input may include an accelerator pedal position and/or a cruise control setting.

At 306, the method determines an intake cam phaser position. The method may determine the intake cam phaser position based on a control signal sent to an intake cam phaser. Additionally, the method may determine the intake cam phaser position based on input received from a sensor that measures the intake cam phaser position.

At 308, the method determines an exhaust cam phaser position. The method may determine the exhaust cam phaser position based on a control signal output to an exhaust cam phaser. Additionally, the method may determine the exhaust cam phaser position based on input received from a sensor that measures the exhaust cam phaser position.

At 310, the method determines a valve overlap period. The valve overlap period is a period during which both an intake valve and an exhaust valve are open. The method may determine the valve overlap period based on the intake cam phaser position and the exhaust cam phaser position.

At 312, the method determines a throttle limit. The method may determine the throttle limit based on engine speed, the valve overlap period, and/or an amount that intake valve timing is retarded relative to timing that yields a peak volumetric efficiency. The method may decrease the throttle limit as engine speed decreases, as the valve overlap period increases, and/or as the intake valve retarding amount increases. The relationship between the throttle limit and the parameters used to determine the throttle limit may be predetermined based on, for example, a specific engine architecture and/or engine calibration. This relationship may be embodied in a lookup table.

At 314, the method determines whether the desired throttle area is greater than the throttle limit. If the throttle area is greater than the throttle limit, the method adjusts the desired throttle area to the throttle limit at 316, controls a throttle valve based on the desired throttle area, and continues at 304. If the throttle area is less than or equal to the throttle limit, method refrains from adjusting the desired throttle area, controls a throttle valve based on the desired throttle area, and continues at 304.

Figure 4:
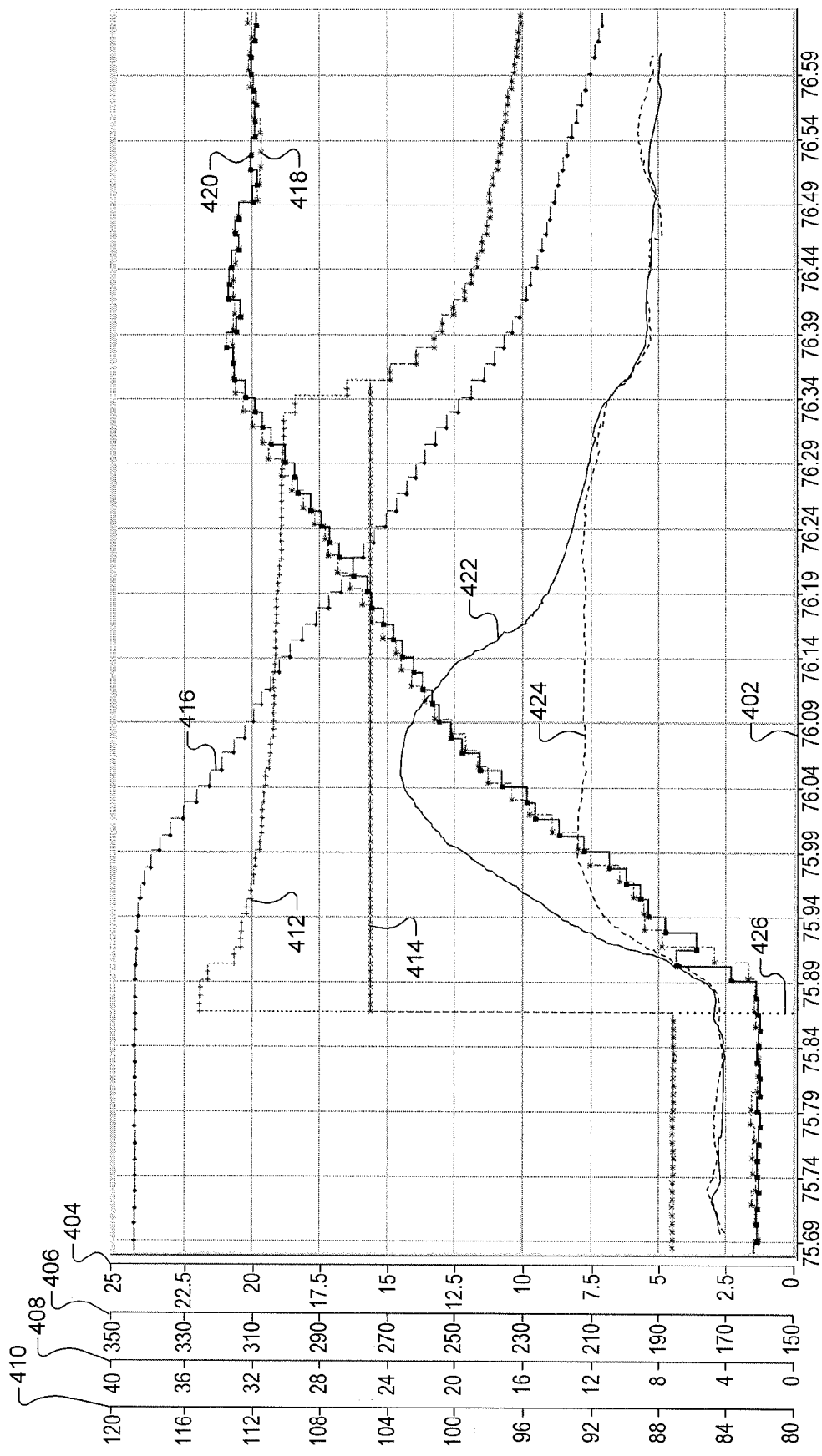
FIG. 4 is a graph illustrating example engine control signals and example engine sensor signals according to the principles of the present disclosure.

Referring now to FIG. 4, a graph illustrates engine control signals and engine sensor signals according to the principles of the present disclosure. An x-axis 402 represents time in seconds. A y-axis 404 represents cam phaser position in degrees, a y-axis 406 represents torque in Newton meters (Nm), a y-axis 408 represents a throttle opening percentage, and a y-axis 410 represents a noise level in decibels (dB).

An unlimited throttle signal 412 indicates a throttle opening percentage when a throttle opening area is not limited based on engine speed or cam phaser positions. A limited throttle signal 414 indicates a throttle opening percentage when the throttle opening area is limited based on engine speed and cam phaser positions. The throttle signals 412, 414 are plotted against the x-axis 402 and the y-axis 408.

An intake cam phaser signal 416 indicates a number of degrees that an intake cam phaser position is retarded relative to a first position. The first position yields a peak volumetric efficiency of a cylinder. The intake cam phaser signal 416 is plotted against the x-axis 402 and the y-axis 404.

An unlimited torque signal 418 indicates engine torque output when the throttle valve is controlled based on the unlimited throttle signal 412. A limited torque signal 420 indicates engine torque output when the throttle valve is controlled based on the limited throttle signal 414. The torque signals 418, 420 are plotted against the x-axis 402 and the y-axis 406.

An unlimited noise signal 422 indicates an engine noise level when the throttle valve is controlled based on the unlimited throttle signal 412. A limited noise signal 424 indicates an engine noise level when the throttle valve is controlled based on the limited throttle signal 414. The noise signals 422, 424 are plotted against the x-axis 402 and the y-axis 410.

At 426, the throttle signals 412, 414 are increased in response to a torque request. The unlimited throttle signal 412 is increased to approximately 22 percent, causing the unlimited noise signal 422 to peak at approximately 103 dB. The limited throttle signal 414 limited at approximately 16 percent, causing the limited noise signal 424 to peak at approximately 93 dB. Thus, limiting the throttle opening area based on engine speed and cam phaser positions reduces engine noise by approximately 10 dB. However, the torque signals 418, 420 are not noticeably different from one another.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a throttle limit determination module that determines a throttle limit based on a position of an intake cam phaser that regulates an opening timing of an intake valve;
   a throttle area adjustment module that adjusts a desired throttle area based on the throttle limit when the desired throttle area is greater than the throttle limit; and
   a throttle control module that controls a throttle opening area of a throttle valve based on the desired throttle area.

2. The system of claim 1, further comprising a phaser control module that controls the intake cam phaser position to regulate intake valve timing.

3. The system of claim 1, further comprising a throttle area determination module that determines the desired throttle area based on driver input.

4. The system of claim 1, wherein the throttle limit determination module determines the throttle limit further based on a valve overlap period.

5. The system of claim 4, further comprising a valve overlap determination module that determines the valve overlap period based on the intake cam phaser position and an exhaust cam phaser position.

6. The system of claim 1, wherein the throttle limit determination module determines the throttle limit further based on engine speed.

7. The system of claim 1, wherein the throttle limit determination module determines the throttle limit further based on a ratio of a manifold absolute pressure to ambient pressure.

8. The system of claim 7, further comprising a pressure ratio determination module that determines the ratio of the manifold absolute pressure to the ambient pressure.

9. The system of claim 8, wherein the pressure ratio determination module receives the ambient pressure from a pressure sensor disposed upstream from the throttle valve.

10. The system of claim 8, wherein the pressure ratio determination module estimates the ambient pressure based on the manifold absolute pressure.

11. A method comprising:
    determining a throttle limit based on a position of intake cam phaser that regulates an opening timing of an intake valve;
    adjusting a desired throttle area based on the throttle limit when the desired throttle area is greater than the throttle limit; and
    controlling a throttle opening area of a throttle valve based on the desired throttle area.

12. The method of claim 11, further comprising controlling the intake cam phaser position to regulate intake valve timing.

13. The method of claim 11, further comprising determining the desired throttle area based on driver input.

14. The method of claim 11, further comprising determining the throttle limit further based on a valve overlap period.

15. The method of claim 14, further comprising determining the valve overlap period based on the intake cam phaser position and an exhaust cam phaser position.

16. The method of claim 11, further comprising determining the throttle limit further based on engine speed.

17. The method of claim 11, further comprising determining the throttle limit further based on a ratio of a manifold absolute pressure to ambient pressure.

18. The method of claim 17, further comprising determining the ratio of the manifold absolute pressure to the ambient pressure.

19. The method of claim 18, further comprising receiving the ambient pressure from a pressure sensor disposed upstream from the throttle valve.

20. The method of claim 18, further comprising estimating the ambient pressure based on the manifold absolute pressure.

* * * * *